United States Patent
Horikawa

(10) Patent No.: US 10,534,317 B2
(45) Date of Patent: Jan. 14, 2020

(54) DISPLAY METHOD AND DISPLAY APPARATUS

(71) Applicant: OLYMPUS CORPORATION, Tokyo (JP)

(72) Inventor: Yoshiaki Horikawa, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/936,010

(22) Filed: Mar. 26, 2018

(65) Prior Publication Data

US 2018/0217555 A1 Aug. 2, 2018

Related U.S. Application Data

(60) Division of application No. 14/638,234, filed on Mar. 4, 2015, now abandoned, which is a continuation of (Continued)

(30) Foreign Application Priority Data

Sep. 5, 2012 (JP) .................................. 2012-194964

(51) Int. Cl.
*G03H 1/12* (2006.01)
*G02B 27/10* (2006.01)
(Continued)

(52) U.S. Cl.
CPC ................. *G03H 1/12* (2013.01); *G02B 5/32* (2013.01); *G02B 27/1086* (2013.01);
(Continued)

(58) Field of Classification Search
CPC ...... G03H 1/2205; G03H 1/12; G03H 1/0808; G03H 1/2294; G03H 2222/20;
(Continued)

(56) References Cited

U.S. PATENT DOCUMENTS 6,222,971 B1 4/2001 Veligdan et al.
6,335,999 B1 1/2002 Winston et al.
(Continued)

FOREIGN PATENT DOCUMENTS

JP 2002-520669 7/2002
JP 2007-505353 3/2007
(Continued)

OTHER PUBLICATIONS

International Search Report, dated May 21, 2013, issued in corresponding International Application No. PCT/JP2013/060911.
(Continued)

*Primary Examiner* — George G King
(74) *Attorney, Agent, or Firm* — Hunton Andrews Kurth LLP

(57) ABSTRACT

A display method lets a display beam to propagate in a transparent substrate while internally reflected repeatedly and lets the display beam partly emit out of the transparent substrate every time the display beam is internally reflected, thereby emitting display beams from almost entirety of a surface of the transparent substrate. The display beam is produced holographically. A display apparatus includes a spatial phase modulator that produces a display beam, a transparent substrate in which the display beam is internally reflected repeatedly to propagate in it, and a splitter that lets the display beam partly emit out of the transparent substrate every time the display beam is internally reflected.

8 Claims, 11 Drawing Sheets

Related U.S. Application Data application No. PCT/JP2013/060911, filed on Apr. 11, 2013.

(51) Int. Cl.
  *G02B 5/32* (2006.01)
  *G03H 1/22* (2006.01)
  *G02F 1/1335* (2006.01)

(52) U.S. Cl.
  CPC ..... *G02F 1/133504* (2013.01); *G03H 1/2205* (2013.01); *G03H 1/2294* (2013.01); *G03H 2223/16* (2013.01); *G03H 2223/23* (2013.01); *G03H 2225/32* (2013.01)

(58) Field of Classification Search
  CPC .......... G03H 2222/46; G03H 2222/52; G03H 2222/53; G03H 2222/54; G03H 2223/16; G03H 2223/23; G03H 2225/31; G03H 2225/32; G02B 5/32; G02F 27/1086; G02F 1/133504

See application file for complete search history.

(56) References Cited

U.S. PATENT DOCUMENTS

| | | | |
|---|---|---|---|
| 7,391,573 B2 | 6/2008 | Amitai | |
| 7,736,006 B2 | 6/2010 | Freeman et al. | |
| 2007/0008624 A1 | 1/2007 | Hirayarna | |
| 2007/0070504 A1 | 3/2007 | Akutsu et al. | |
| 2008/0192259 A1* | 8/2008 | Sumiyama | G02B 5/32 356/457 |
| 2010/0039796 A1 | 2/2010 | Mukawa | |
| 2011/0176218 A1* | 7/2011 | Noui | G02B 6/0035 359/633 |
| 2012/0092750 A1 | 4/2012 | Kroll et al. | |
| 2012/0218481 A1 | 8/2012 | Popovich et al. | |
| 2013/0222384 A1 | 8/2013 | Futterer | |
| 2014/0002875 A1* | 1/2014 | Yankov | G02B 5/32 359/15 |
| 2014/0140653 A1* | 5/2014 | Brown | G02B 6/0033 385/10 |

FOREIGN PATENT DOCUMENTS

| | | | |
|---|---|---|---|
| JP | 2007-240641 | 9/2007 | |
| JP | 2008-270222 | 11/2008 | |
| JP | 2009-516862 | 4/2009 | |
| JP | 4605152 | 10/2010 | |
| WO | WO2012/062681 | * 5/2012 | ............ G02B 27/22 |

OTHER PUBLICATIONS

International Preliminary Report on Patentability, dated Mar. 19, 2015, issued in corresponding International Application No. PCT/JP2013/060911.

* cited by examiner

DISPLAY METHOD AND DISPLAY APPARATUS

CROSS-REFERENCE TO RELATED APPLICATION

The present application is a divisional of U.S. application Ser. No. 14/638,234, filed on Mar. 4, 2015, which is a continuation application of International Application No. PCT/JP2013/060911, filed on Apr. 11, 2013, and claims a benefit of priority from the prior Japanese Patent Application No. 2012-194964 filed on Sep. 5, 2012; the entire contents of which are incorporated herein by reference.

BACKGROUND OF THE INVENTION

Field of the Invention

The present invention relates to a display apparatus and display method.

Description of the Related Art

In recent years, there has been developed an image display apparatus adapted to form a virtual image of a display screen in front of a viewer. In this image display apparatus, a display beam is internally reflected repeatedly in a transparent substrate to propagate in the substrate. Every time the display beam is internally reflected, a portion of the display beam is emitted out of the substrate. Thus, the display beam is emitted from almost the entire surface of the substrate in this image display apparatus (Japanese Patent Publication No. 4605152).

More specifically, in this image display apparatus, the display beam is emitted from a display screen of a liquid crystal display element. The display beam emitted from the display screen is converted into a parallel beam by an objective lens to enter the transparent substrate. The display beam is internally reflected repeatedly in the transparent substrate to propagate in the substrate. Every time the display beam is internally reflected, the display beam partly is emitted out of the substrate. Since display beams emit out of the substrate at multiple locations in this way, the display beams are emitted from the entire surface of the transparent substrate. Consequently, the diameter of the overall display beams emitting out of the transparent substrate is larger than the diameter of the beam incident on the transparent substrate.

In order for the viewer to see a virtual image of the display screen, it is necessary for the display beam emitted from the transparent substrate to enter his/her eye. In the image display apparatus described above, the diameter of the display beam emitting out of the transparent substrate is large. Consequently, the allowable range of alignment of the eye with the display beam (or the transparent substrate) is larger than that in the case where the diameter of the display beam is small. Therefore, the viewer can observe the virtual image more easily.

Moreover, the display beam emitting from the transparent substrate is a parallel beam. This allows the viewer to observe a virtual image located in rear of the transparent substrate. Furthermore, since the display beam has a large diameter, it is not necessary for the viewer to locate his/her eye close to the display apparatus. In connection with the above, the location in rear of the transparent substrate refers to a location on the opposite or far side of the transparent substrate to the location of the viewer.

SUMMARY OF THE INVENTION

To solve the above object and to achieve the object, a display method according to the present invention comprises:
letting a display beam to propagate in a transparent substrate while internally reflected repeatedly; and
letting the display beam partly emit out of the transparent substrate every time the display beam is internally reflected, thereby emitting display beams from almost entirety of a surface of the transparent substrate,
wherein the display beam is produced holographically.

A display apparatus according to the present invention comprises:
a spatial phase modulator that produces a display beam;
a transparent substrate in which the display beam is internally reflected repeatedly to propagate in it; and
a splitter that lets the display beam partly emit out of the transparent substrate every time the display beam is internally reflected.

BRIEF DESCRIPTION OF THE DRAWINGS

FIG. 1A shows a case in which a divergent beam is made incident on a transparent substrate, and FIG. 1B shows a case in which a parallel beam is made incident on a transparent substrate;

FIG. 2A is a diagram showing an ordinary optical system used to observe a virtual image, and FIG. 2B is a diagram showing an optical system that produces a display beam holographically;

FIG. 4A shows a case in which a divergent beam is made incident on a transparent substrate, and FIG. 4B shows a case in which a parallel beam is made incident on a transparent substrate;

FIG. 6A shows a case in which a divergent beam is made incident on a transparent substrate, and FIG. 6B shows a case in which a parallel beam is made incident on a transparent substrate;

FIG. 7A is a diagram showing the construction of a first transparent substrate and how a display beam propagates, and FIG. 7B is a diagram showing the construction of a second transparent substrate and how display beams propagate;

FIG. 9A is a diagram showing the construction of a first transparent substrate, and FIG. 9B is a diagram showing the relationship between incident light, diffracted light, and zero-order light;

FIG. 10A shows a case in which a reflective spatial phase modulator is used, and FIG. 10B shows a case in which a transmissive spatial phase modulator is used;

DETAILED DESCRIPTION OF THE INVENTION

Figure 1A:
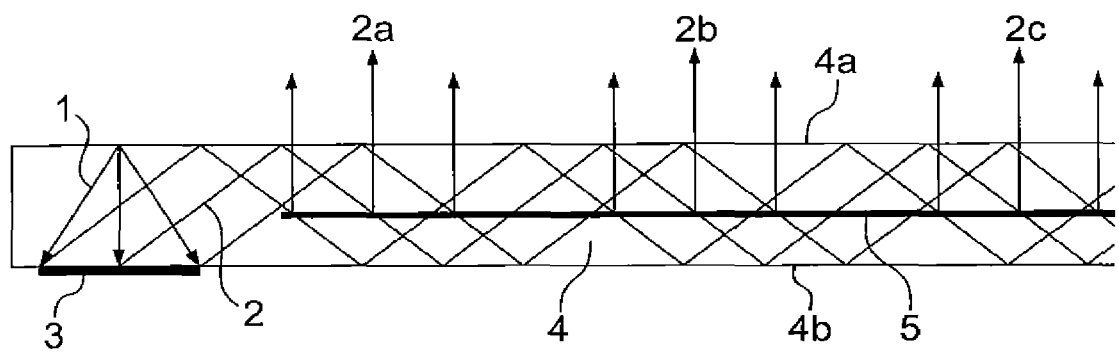
FIGS. 1A and 1B are diagrams showing the basic construction of an apparatus and how a display beam propagates, where

Operations and advantageous effects of embodiments according to some modes of the present invention will be described. The operations and advantageous effects of the embodiments will be described as specific illustrative modes. However, the illustrative modes that will be described are only some examples of the modes falling within the scope of the present invention, and there are many variations of these modes. Therefore, the present invention is not limited to the illustrative modes described in the following.

According to a display method of an embodiment, a display beam produced holographically is caused to be internally reflected repeatedly in a transparent substrate to propagate in the transparent substrate, and the internally reflected display beam partly is emitted out of the transparent substrate for display every time the display beam is internally reflected. As the display beam propagates, multiple display beams are emitted from the transparent substrate. In this way, the display beams are emitted from almost the entire surface of the transparent substrate.

In the display method of this embodiment, a display beam is produced holographically. Therefore, a display method having high optical performance can be realized with a small and slim apparatus. Producing a display beam holographically means producing (or reproducing) a display beam using a hologram.

According to the display method of this embodiment, as the display beam propagates, multiple display beams are emitted from the transparent substrate. A viewer can view an image by seeing one of the display beams or a plurality of display beams. Therefore, the display beams can be regarded collectively as a single display beam having a large diameter. Not only axial display beams representing the center of a picture but also off-axis display beams representing a point on the edge of the picture can also be regarded collectively as a single display beam having a large diameter. Thus, in the display method of this embodiment, multiple beams emitted from the transparent substrate are equivalent to a single display beam having a large diameter emitted from the entire surface of the transparent substrate. Therefore, the entire surface of the transparent substrate constitutes an exit pupil, and the size of the exit pupil is equal to the size of the transparent substrate. Thus, the size of the pupil is large, as is the case with a magnifier whose pupil extends over its entirety, and therefore the viewer can see a virtual image without locating his/her head near the display apparatus.

In the display method of this embodiment, the display beams emitted out of the transparent substrate are beams that display a virtual image at infinity. In other words, when the viewer sees the display beams, a virtual image is formed at infinity (at a distant location). Therefore, each of the plurality of display beams emitted from the transparent substrate forms, when seen by the viewer, a virtual image at infinity. Consequently, even if the viewer's eyes are presbyopic and can be focused only on far points, the viewer can see display in focus. Moreover, the viewer can see a virtual image formed at infinity by seeing any one of the display beams or seeing a plurality of display beams at the same time. The display beams (which are produced holographically) are parallel beams.

The display method of this embodiment causes a display beam to be reflected, amplitude-splits the reflected display beam to produce a beam travelling in the direction same as the travelling direction of the reflected display beam and a beam travelling in a direction different from the travelling direction of the reflected display beam, and performs the reflecting and the amplitude-splitting repeatedly. The display beam may be a beam produced by diffraction.

Figure 1B:
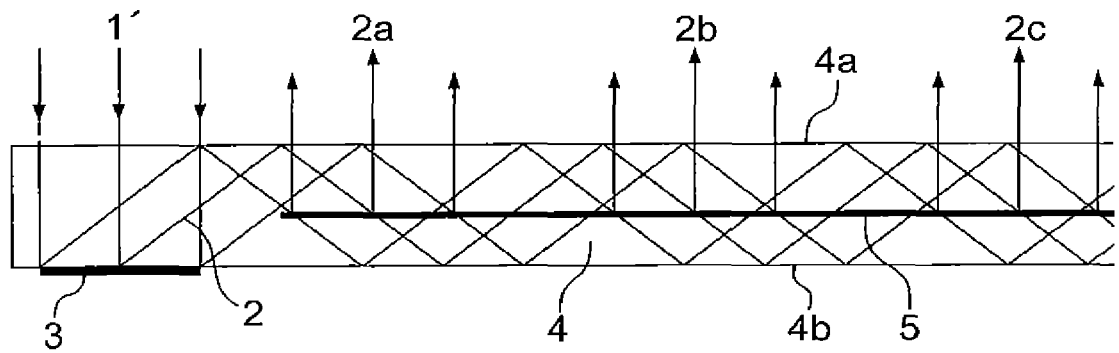

Next, the basic construction of a display apparatus according to this embodiment will be described. FIGS. 1A and 1B are diagrams showing the basic construction of the display apparatus of this embodiment and how a display beam propagates, where FIG. 1A shows a case in which a divergent beam is made incident on the transparent substrate, and FIG. 1B shows a case in which a parallel beam is made incident on the transparent substrate.

As shown in FIGS. 1A and 1B, the display apparatus of this embodiment has an LCOS (Liquid Crystal On Silicone, which is a reflective liquid crystal display device) 3, 3', a transparent substrate 4, and a diffraction grating 5. The LCOS 3, 3' is an SPM (Spatial Phase Modulator), which is a hologram display element that produces a display beam 2 holographically. The LCOS 3, 3' may be replaced by a transmission liquid crystal display.

The transparent substrate 4 has a first interface (first transmitting surface) 4a and a second interface (second transmitting surface) 4b. The display beam 2 is reflected (total reflection) on the internal surfaces such as the first interface 4a and the second interface 4b of the transparent substrate 4, so that the display beam 2 propagates inside the transparent substrate 4.

The diffraction grating 5 serves as splitting means. Every time the display beam 2 is internally reflected, the diffraction grating 5 lets the beam partly emit out of the transparent substrate 4. The diffraction grating 5 is arranged at a location between the first interface 4a and the second interface 4b. The diffraction grating 5 is arranged in such a way as to be opposed to the LCOS 3, 3'. The diffraction grating 5 may be composed of a volume hologram.

To produce a display beam 2, it is necessary to make illumination light incident on the LCOS 3, 3'. FIG. 1A shows a case in which illumination light emitting from a light source (not shown) is a divergent beam. The divergent beam 1 enters the transparent substrate through the first interface 4a and is incident on the LCOS 3 provided on the second interface 4b. The LCOS 3 is displaying a phase hologram (hologram pattern or phase pattern), so that the divergent beam 1 incident on the LCOS 3 is diffracted by the phase hologram (LCOS 3). Consequently, a display beam 2 is produced holographically by means of the LCOS 3. The display beam 2 is produced as first-order diffracted light (first-order light) by the hologram displayed on the LCOS 3. The zero-order diffracted light (zero-order light) produced by direct reflection by the LCOS 3 is emitted out of the transparent substrate 4.

In the case of the display apparatus shown in FIG. 1A, the phase hologram displayed on the LCOS 3 is one that produces a parallel display beam 2 when a divergent beam 1 is incident on it. The display beam 2 is an axial display beam (i.e. a beam emitting from the center of the picture). Off-axis display beams (i.e. beams emitting from points in the picture other than the center) are also produced holographically by means of the LCOS 3, though the off-axis display beams are not shown in the drawing.

On the other hand, FIG. 1B shows a case in which illumination light emitting from the light source (not shown) is a parallel beam. The parallel beam 1' enter the transparent substrate through the first interface 4a and is incident on the LCOS 3' provided on the second interface 4b. The LCOS 3' is displaying a phase hologram (hologram pattern or phase pattern), so that the illumination light incident on the LCOS 3' is diffracted by the phase hologram (LCOS 3'). Consequently, a display beam 2 is produced holographically by means of the LCOS 3'. The display beam 2 is produced as first-order diffracted light (first-order light) by the hologram displayed on the LCOS 3'. The zero-order diffracted light (zero-order light) produced by direct reflection by the LCOS 3' is emitted out of the transparent substrate 4.

In the case of the display apparatus shown in FIG. 1B, the phase hologram displayed on the LCOS 3' is one that produces a parallel display beam 2 when a parallel beams 1' is incident on it. The display beam 2 is an axial display beam (i.e. a beam emitting from the center of the picture). Off-axis display beams (i.e. beams emitting from points in the picture other than the center) are also produced holographically by means of the LCOS 3', though the off-axis display beams are not shown in the drawing.

Besides a divergent beam and a parallel beam, a convergent beam may be made incident on the LCOS 3, 3'. In the case where a convergent beam is made incident on the LCOS 3, 3', the LCOS 3, 3' may be adapted to display a hologram that produces a parallel display beam when a convergent beam is incident on it.

Figure 2A:
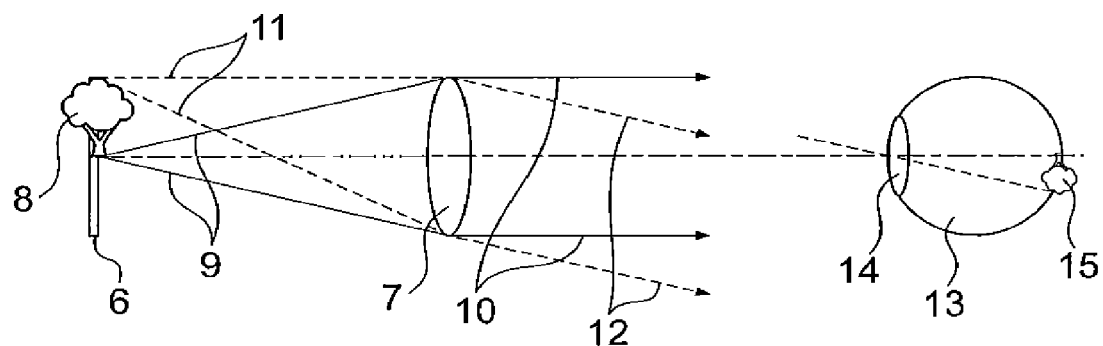
FIGS. 2A and 2B are diagrams showing a method and apparatus for producing a display beam holographically, where
Figure 2B:
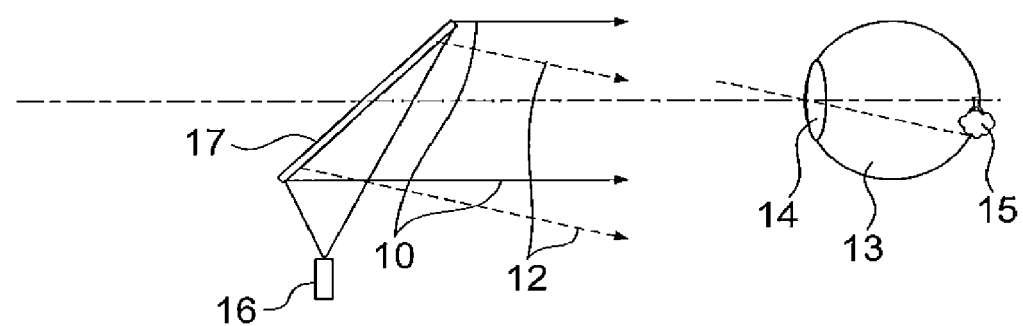

A method and apparatus for generating display beams 2 holographically will be described in detail with reference to FIGS. 2A and 2B. FIG. 2A is a diagram showing an ordinary optical system used to view a virtual image. FIG. 2B is a diagram showing an optical system used to produce a display beams holographically. The display beams are beams with which a viewer sees a virtual image (parallel beams 10, 12 in FIG. 2A).

The optical system shown in FIG. 2A is composed of a display device 6 such as an LCD and a lens 7. If the display device 6 is located at the position of the focal point (front focal point) of the lens 7, a picture 8 displayed on the display device 6 is projected to infinity by the lens 7. Solid lines 9 represent a beam emitting from the center (on the axis) of the display device 6, and broken lines 11 represent a beam emitting from a point on the edge (off-axis) of the display device 6. The beam represented by the solid lines 9 becomes a parallel beam 10 when emitting from the lens 7. The beam represented by the broken lines 11 also becomes a parallel beam 12 when emitting from the lens 7.

The parallel beams 10 and 12 enter the pupil 14 of the viewer's eye 13. Consequently, the viewer can see an image 15 of the picture 8. Since the beams 10 and 12 incident on the viewer's pupil 14 are parallel beams, the viewer sees a virtual image located in rear of the display apparatus (on the left side of the display device 6 in FIG. 2A), namely a virtual image located at infinity. Therefore, even if the viewer's eyes are presbyopic and can be focused only on far points, the viewer can see the picture 8 in focus.

FIG. 2B shows an optical system used to holographically produce parallel beams 10, 12. This optical system is composed of a coherent light source 16 and an SPM (Spatial Phase Modulator) 17. An example of the coherent light source 16 is an LD (Laser Diode). An example of the SPM 17 is an LCOS described above. The SPM 17 is a hologram display element. Hereinafter, the hologram display element will be referred to as the SPM.

A hologram has a hologram pattern. The hologram pattern is an interference pattern formed by two wave fronts. One of the wave fronts is one emitting from the lens 7, and the other wave front is one emitting from the coherent light source 16 in FIG. 2B. The wave front emitting from the lens 7 (parallel beams 10, 12) contains information of an image of the picture 8. On the other hand, the wave front emitting from the coherent light source 16 is a wave front that forms interference fringes and, at the same time, is used to produce reproduction light from the hologram.

The light emitted from the display device 6 is incoherent light. Consequently, light emitted from the display device 6 and the wave front emitting from the coherent light source 16 will not interfere, even if they are superposed. In other word, a hologram pattern cannot be obtained by superposition. Therefore, in practice, a hologram (hologram pattern) is obtained by computation. The hologram obtained by computation is displayed on the SPM 17, which is illuminated by the coherent light source 16. In this way, a hologram or parallel beams 10, 12 are reproduced. The display beam 2 shown in FIGS. 1A and 1B is the parallel beam 10 among the parallel beams 10 and 12.

The viewer can view the picture 8 by seeing the parallel beams 10, 12 that are thus produced holographically. In other words, the parallel beams 10, 12 enter the pupil 14 of the viewer's eye 13 to form an image 15.

In the optical system shown in FIG. 2A, it is necessary for the lens 7 to project an image of the off-axis portion of the picture (the portion of the picture displayed in the peripheral or outer portion of the display device 6) onto the eye 13 with high resolving power. To this end, the lens 7 is composed of a plurality of lenses in practice. It is also necessary for the lens 7 to have a large diameter. For these reasons, if the optical system shown in FIG. 2A is used in the display apparatus, it is difficult to make the display apparatus slim and compact.

Figure 3:
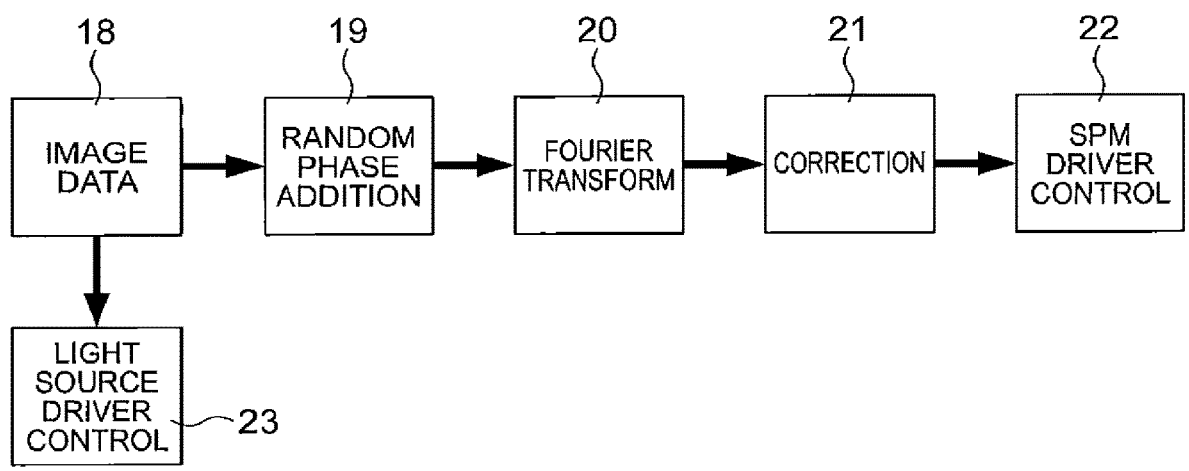
FIG. 3 is a block diagram of a process of obtaining a hologram by computation.

Next, preparation of a hologram by computation will be described in detail. FIG. 3 is a block diagram of a process of preparing hologram by computation. As shown in FIG. 3, image data 18 is firstly prepared. The image data 18 is data to be input to the display device 6 in FIG. 2A. The wave front emitting from the lens 7 is computed by Fourier-transforming the image data 18 by the Fourier transform 20.

Since a spatial frequency distribution obtained by Fourier transform includes a spatial phase distribution as well as a spatial intensity distribution, it is not possible to create a phase hologram having a high diffraction efficiency. So random phase addition 19 is performed before the Fourier transform 20. Adding (superposing) random phase information to the image data 18 in advance can average the spatial intensity values after the Fourier transform over the entire spatial frequency plane or can substantially equalize the spatial intensities. Consequently, it is possible to form a hologram as a phase hologram having only phase information.

Then, correction 21 is performed. The correction 21 is based on the arrangement of the optical system. For example, in the case of the optical system shown in FIG. 2B, a hologram (parallel beams 10, 12) is reproduced using a wave front emitting from the coherent light source 16. It is necessary that this reproduction can produce accurate display beams 2 (parallel beams 10, 12). Since the wave front emitted from the coherent light source 16 is a spherical wave, the correction 21 computes a hologram using information of this spherical wave. Then the result of computation (hologram information) is input to SPM driver control 22. A hologram is displayed on the SPM (or LCOS 3, 3', in FIGS. 1A and 1B) based on control information supplied by the SPM driver control 22.

Since the diffraction efficiency of the SPM 17 is substantially constant, images of bright scenes and images of dark scenes would have substantially equal brightness. In view of this, when display beams are produced holographically, it is necessary to control the quantity of light incident on the SPM 17 in accordance with the total light quantity of the image. Hence, total light quantity data of the image data is input to a light source driver 23 to control the intensity of the light source.

Referring back to FIG. 1A, the display beam 2 emitted from the LCOS 3 is totally reflected at the first interface 4a of the transparent substrate 4 and then incident on the diffraction grating 5. The display beam 2 is partly diffracted by the diffraction grating 5. The direction of diffraction is normal to the first interface 4a. The beam diffracted by the diffraction grating 5 is emitted from the transparent substrate 4 to the outside to become a display beam 2a.

The display beam 2 transmitted through the diffraction grating 5 is totally reflected at the second interface 4b of the transparent substrate 4 and then passes through the diffraction gratings. The display beam 2 having passed through the diffraction grating 5 is totally reflected at the first interface 4a again and incident on the diffraction grating 5. The display beam 2 is partially diffracted by the diffraction grating 5. The direction of diffraction is normal to the first interface 4a. The beam diffracted by the diffraction grating 5 is emitted from the transparent substrate 4 to the outside to become a display beam 2b. The display beam 2 further propagates in the transparent substrate 4 to produce another display beam 2c in the same manner. With repetition of the above process, a lot of display beams (2a, 2b, 2c) are emitted from the entire surface of the transparent substrate 4 (or the first interface 4a).

The viewer can see a virtual image if at least one of the display beams 2a, 2b, 2c is incident on his/her eye. In the case, for example, where the image data 18 is motion video data, the viewer can see motion video. In the case where the image data is still image data, the observer can see a still image.

In the basic configuration of the display apparatus of this embodiment, the display beam 2 are produced using the LCOS 3. Therefore, there can be provided a small and slim display apparatus having high optical performance. A beam made incident on the LCOS 3 may only be axial beams. Therefore, light emitted from the light source may directly be used as a beam to be incident on the LCOS 3. In this case, it is not necessary to provide a lens for beam conversion, leading to size reduction and slimming of the display apparatus.

In the case where a beam made incident on the LCOS 3' is a parallel beam also, it is sufficient that only a parallel axial beam be made incident on the LCOS 3'. Therefore, a lens used to convert a convergent beam or a divergent beam into a parallel beam can be simple. Consequently, even in the case where a beam made incident on the LCOS 3' is a parallel beam, slimming and size reduction of the display apparatus can be achieved.

Furthermore, in the basic configuration of the display apparatus of this embodiment, the display beam 2 is produced holographically by the LCOS 3, 3'. This allows slimming and size reduction of the display apparatus.

In the basic construction of the display apparatus of this embodiment, as the display beam propagates, a plurality of display beams 2a, 2b, 2c are emitted from the transparent substrate 4. The viewer can see a virtual image if at least one of the display beams is incident on the pupil of his/her eye. In the basic construction of the display apparatus of this embodiment, there are a plurality of display beams 2a, 2b, 2c, which are equivalent to a display beam having a large diameter. The display beam includes an axial beam representing the center of the picture and off-axis beams representing points on the edge of the picture. The diameters of both types of display beams are large, and the exit pupil extends over the entire surface of the transparent substrate from which the display beams emitted. In consequence, the allowable range of alignment of the eye with the display beam (or the transparent substrate 4) is larger than that in the case where the diameter of the display beam is smaller. Therefore, the viewer can see the virtual image easily.

As described above, an LCOS or a transmission liquid crystal display device is used as the SPM. Alternatively, a deformable mirror may also be used. Types of deformable mirrors include one having a plurality of small mirrors, each of which is deflected and one in which one thin mirror is deformed.

The display apparatus can be produced, for example, by firstly forming a recess on a portion of the transparent substrate 4 on which the diffraction grating 5 is to be arranged, then arranging the diffraction grating 5 in the recess, and thereafter covering the diffraction grating 5 with a transparent part that substantially fits the recess. Alternatively the display apparatus can be produced by forming a slit-like recess parallel to the first interface 4a on a side surface of the transparent substrate 4, then inserting the diffraction grating 5 into the recess, and thereafter covering the side surface with a transparent part or adhesive.

Figure 4A:
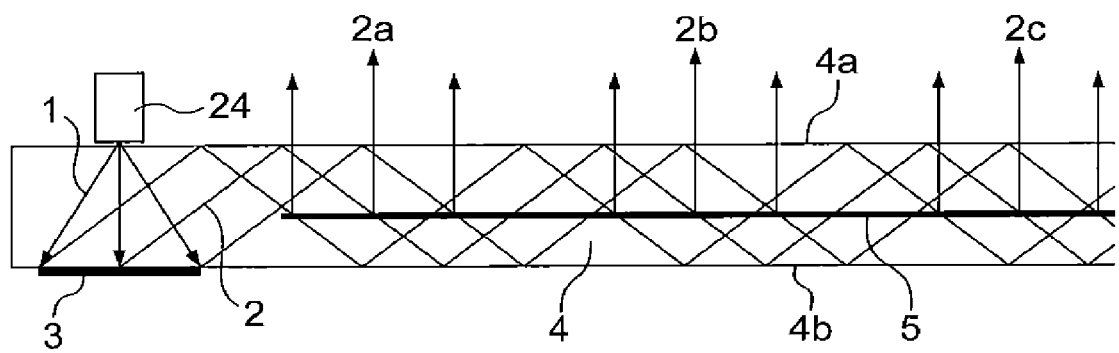
FIGS. 4A and 4B are diagrams showing a display apparatus according to a first embodiment, where
Figure 4B:
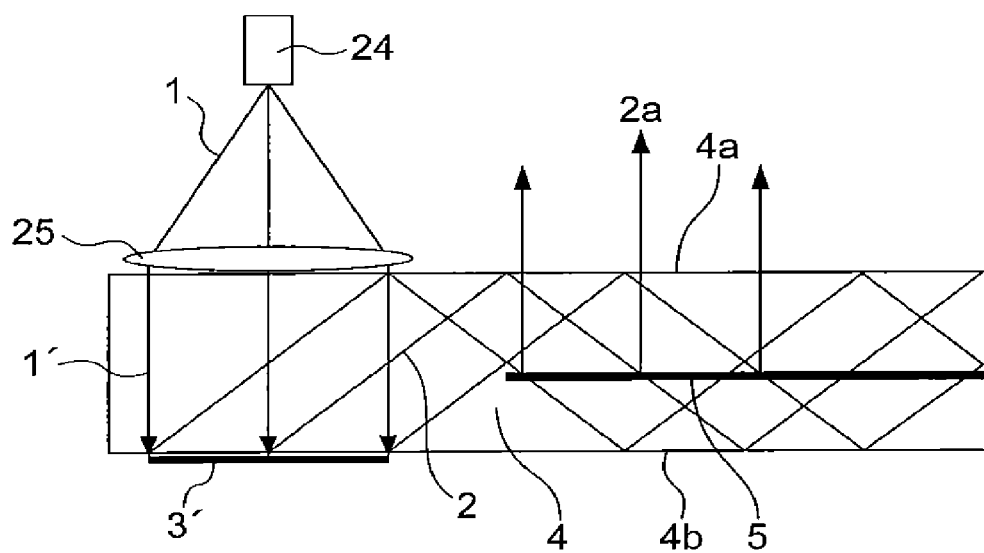

A display apparatus according to a first embodiment is shown in FIGS. 4A and 4B. FIG. 4A shows a case in which a divergent beam is made incident on the transparent substrate, and FIG. 4b shows a case in which a parallel beam is made incident on the transparent substrate. In the display apparatus of this embodiment, an LCOS (reflective liquid crystal display device) 3, 3' is used as an SPM (spatial phase modulator).

The display apparatus of this embodiment includes a light source 24, an LCOS (reflective liquid crystal display device) 3, 3', a transparent substrate 4, and a diffraction grating 5. The components having the same functions as those in the display apparatus shown in FIG. 1 are denoted by the same reference numerals to eliminate description of them.

The transparent substrate 4 has a first interface (first transmitting surface) 4a and a second interface (second transmitting surface) 4b. A display beam 2 is reflected (total reflection) on the internal surfaces or the first interface 4a and the second interface 4b of the transparent substrate 4, so that the display beam 2 propagates inside the transparent substrate 4.

The LCOS 3, 3' is an SPM (Spatial Phase Modulator), which is an element that produces a display beam 2. The LCOS 3, 3' is a hologram display element that produces a display beam 2 holographically. The LCOS 3, 3' is arranged at a location between the light source 24 and the second interface 4b. More specifically, the LCOS 3, 3' is provided on the side of the second interface 4b that is in contact with the air.

The diffraction grating 5 serves as splitting means. Every time the display beam 2 is internally reflected, the diffraction grating 5 lets the beam partly emit out of the transparent substrate 4. The diffraction grating 5 is arranged at a location between the first interface 4a and the second interface 4b.

The diffraction grating 5 is arranged in such a way as to be opposed to the LCOS 3, 3'. The diffraction grating 5 may be composed of a volume hologram. When the transparent substrate 4 is seen from the light source 24 side, the LCOS 3, 3' and the diffraction grating 5 are arranged side by side.

With this structure, a display beam 2 is emitted from the LCOS 3, 3'. As described above with reference to FIGS. 1A and 1B, the display beam 2 propagates in the substrate 4, and display beams 2a, 2b, 2c are emitted out of the transparent substrate 4. In the display apparatus shown in FIG. 4B also, display beams 2b, 2c are produced, though not illustrated.

The LCOS 3 shown in FIG. 4A is displaying a hologram (phase hologram) that produces a parallel display beam 2 when a divergent beam 1 is made incident on it. Therefore, a divergent beam 1 emitted from the light source 24 may be directly made incident on the LCOS 3 without any conversion. This consequently allows the light source 24 to be arranged close to the transparent substrate 4 and the LCOS 3. In the case shown in FIG. 4A, the light source 24 is in contact with the first interface 4a. This enables slimming and size reduction of the display apparatus.

The light source 24 may be arranged closer to the second interface 4b than the first interface 4a. For example, a recess (cavity) extending from the first interface 4a into the transparent substrate 4 may be formed, and the light source 24 maybe arranged in that recess. This enables further slimming and size reduction of the display apparatus. Alternatively, the light source 24 may be arranged at a location a little away from the first interface 4a (in the proximity of the first interface 4a) so long as slimming or size reduction of the display apparatus is not prevented.

As described above, since the display apparatus shown in FIG. 4A does not need a lens for beam conversion, slimming and size reduction of the display apparatus can be achieved.

On the other hand, the LCOS 3' shown in FIG. 4B is displaying a hologram that produces a parallel display beam 2 when a parallel beam 1' is made incident on it. Therefore, a lens 25 is provided in the optical path from the light source 24 to the LCOS 3'. This lens 25 converts a divergent beam 1 into a parallel beam 1'. In the display apparatus shown in FIG. 4B, the lens 25 provided in the apparatus makes it difficult to arrange the light source 24 in the proximity of the first interface 4a. Consequently, the display apparatus shown in FIG. 4B might not be slimmed down or reduced in size so much as the display apparatus shown in FIG. 4A.

Nevertheless, it is sufficient in the display apparatus shown in FIG. 4B that only the axial beam be made incident on the LCOS 3'. Therefore, the lens 25 can be made simple. For example, the lens 25 may be constituted by a small number of lenses. A single lens is adequate as the lens 25 in the display apparatus shown in FIG. 4B. Aberrations of the lens may be corrected in the aforementioned correction 21 (FIG. 3). For the above reasons, in the case where the beam made incident on the LCOS 3' is a parallel beam also, the display apparatus can be made slimmer and smaller in size than the conventional display apparatus (shown in FIG. 2A).

In the display apparatuses shown in FIGS. 4A and 4B, the LOCS 3, 3' may be arranged to be closer to the first interface 4a than the second interface 4b (namely, between the first interface 4a and the second interface 4b).

Hologram information of the hologram to be displayed by the LCOS 3 is corrected by correction 21 (FIG. 3). With this correction, an accurate display beam 2 is produced when a divergent beam 1 is incident on the LCOS 3. Similarly, hologram information of the hologram to be displayed by the LCOS 3' is also corrected by correction 2l (FIG. 3). With this correction, an accurate display beam 2 is produced when a parallel beam 1' is incident on the LCOS 3'.

In the case of the display apparatus shown in FIG. 4A, the zero-order light reflected by the LCOS 3 (zero-order diffracted light) is emitted from the transparent substrate 4 as diverging light. Therefore, it does not adversely affect the display (or observation of the virtual image). In the case of the display apparatus shown in FIG. 4B, zero-order light reflected by the LCOS 3' is emitted from the transparent substrate 4 perpendicularly without change (i.e. as a parallel beam). Therefore, it does not adversely affect the display (or observation of the virtual image).

In the display apparatus of this embodiment, the LCOS 3 and the LCOS 3' are arranged in such a way that the condition that zero order light is transmitted through the transparent substrate 4 and first-order light (or the display beam 2) is totally reflected by the transparent substrate 4 (or the interfaces 4a, 4b) is met. Therefore, zero-order light does not adversely affect the display (or observation of the virtual image).

In the case of the display apparatus of this embodiment also, since the beams incident on the viewer's eye are parallel beams, the viewer would see a virtual image located in rear of the display apparatus or a virtual image at infinity. Therefore, even if the viewer's eyes are presbyopic and can be focused only on far points, the viewer can see the picture 8 in focus.

In the drawings showing the display apparatus of this embodiment, only the axial display beam 2 is illustrated, and off-axis beams are not illustrated for the sake of simplicity. It should naturally be understood that there also are off-axis beams.

Figure 5:
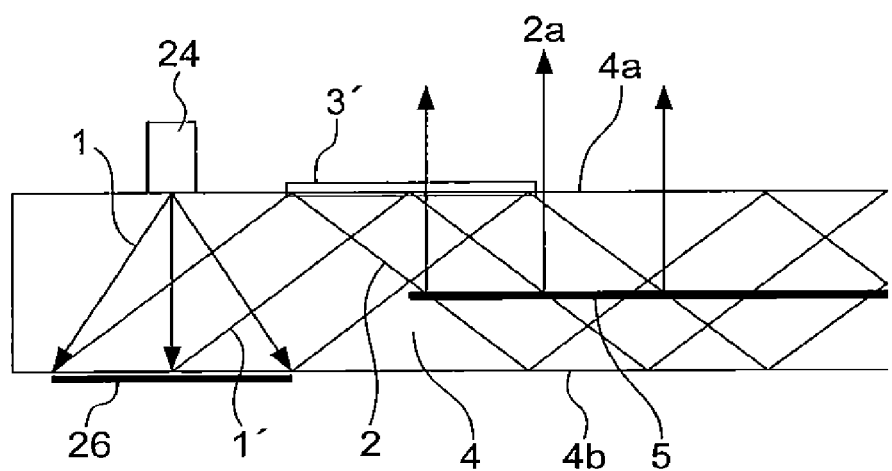
FIG. 5 is a diagram showing a display apparatus according to a second embodiment.

A display apparatus according to a second embodiment is shown in FIG. 5. The display apparatus of this embodiment has an additional LCOS 26 arranged in the optical path from the light source 24 to the LCOS 3'. Specifically, as shown in FIG. 5, the LCOS 3' is arranged on the first interface 4a, and the LCOS 26 is arranged on the second interface 4b. The components having the same functions as those in the display apparatus according to the first embodiment are denoted by the same reference numerals to eliminate description of them.

The LCOS 3' is displaying a hologram that produces a parallel display beam 2 when a parallel beam 1' is made incident on it. On the other hand, the LCOS 26 is displaying a hologram that produces a parallel beam 1' when a divergent beam 1 is made incident on it.

A divergent beam 1 emitted from the light source 24 is incident on the LCOS 26. The divergent beam 1 is converted into a parallel beam 1' by the LCOS 26. The parallel beam 1' after the conversion is emitted from the LCOS 26. The parallel beam 1' emitting from the LCOS 26 is incident on the LCOS 3'. The LCOS 3' produces (reproduces) a display beam 2 from the parallel beam 1', and the display beam 2 is emitted from the LCOS 3'. As described with reference to FIGS. 1A and 1B, as the display beam 2 propagates in the transparent substrate 4, display beams 2a, (2b, 2c) are emitted outside from the transparent substrate 4.

In the case of the display apparatus shown in FIG. 4B (first embodiment), it is necessary to provide a lens 25 between the light source 24 and the first interface 4a. This necessitates the light source 24 to be located at a position away from the first interface 4a. Consequently, the display apparatus cannot be slimmed down or reduced in size to a sufficient degree.

On the other hand, in the case of the display apparatus of this embodiment, the LCOS 26 having a function like the lens 25 can be arranged on the second interface 4b. This allows the light source 24 to be arranged close to the first interface 4a. In consequence, the display apparatus can be slimmed down and reduced in size to a degree substantially the same as the display apparatus shown in FIG. 4A (first embodiment).

In FIG. 5, when the transparent substrate 4 is seen from the light source 24 side, the LCOS 3' and the diffraction grating 5 overlap each other. Actually, however, the LCOS 3' and the diffraction grating 5 are arranged side by side so that display beam 2a diffracted by the diffraction grating 5 does not pass through the LCOS 3'.

In the drawing showing the display apparatus of this embodiment, only the axial display beam 2 is illustrated, and off-axis beams are not illustrated for the sake of simplicity. It should naturally be understood that there also are off-axial beams. The LCOS 26 may be replaced by an ordinary hologram (or hologram lens). In that case, it is preferred that the hologram used be a volume hologram because of its diffraction efficiency.

Figure 6A:
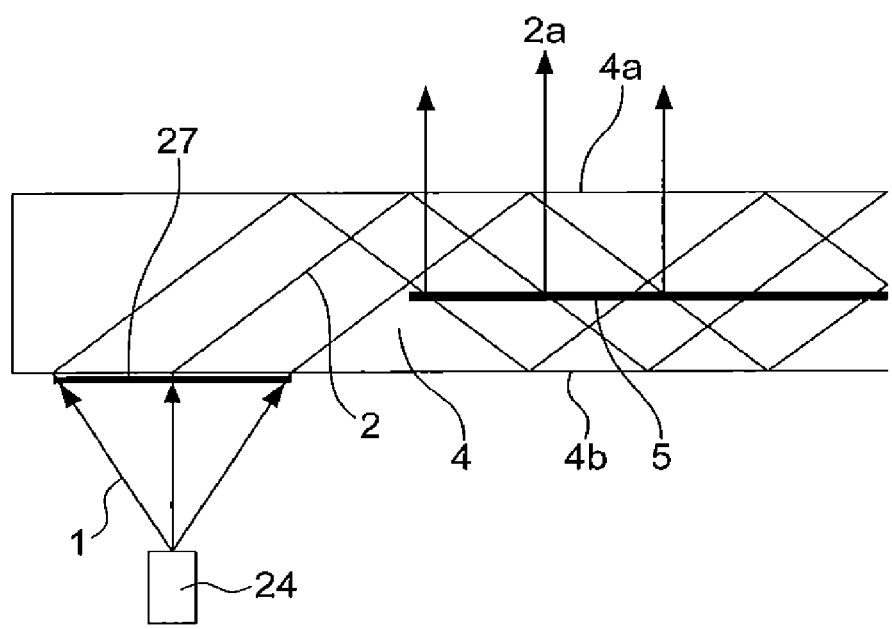
FIGS. 6A and 6B are diagrams showing a display apparatus according to a third embodiment, where
Figure 6B:
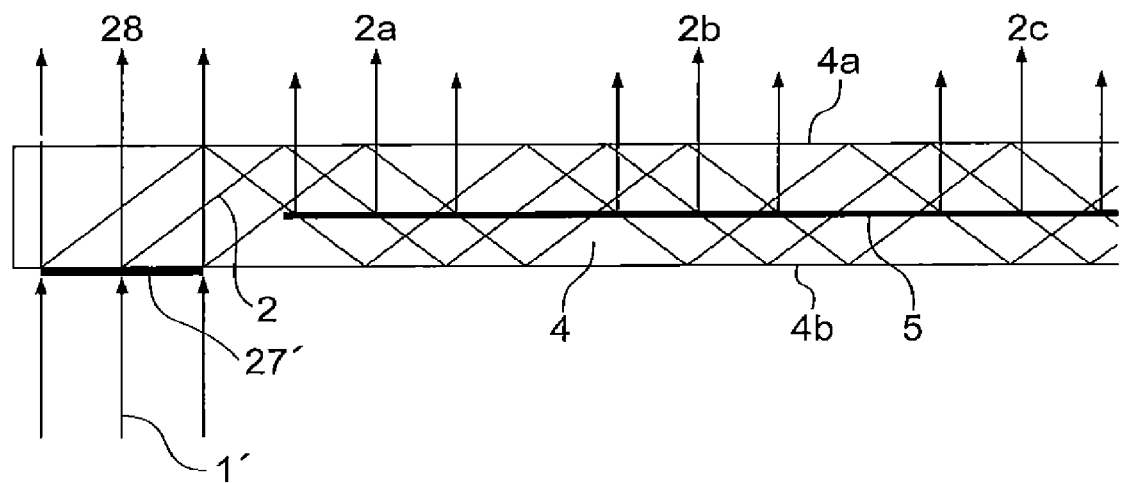

A display apparatus according to a third embodiment is shown in FIGS. 6A and 6B. FIG. 6A shows a case in which a divergent beam is made incident on the transparent substrate, and FIG. 6B shows a case in which a parallel beam is made incident on the transparent substrate. The display apparatus of this embodiment uses an LCD (transmission liquid crystal display device) as an SPM (spatial phase modulator).

The display apparatus of this embodiment has a light source 24, an LCD (transmission liquid crystal display device) 27, 27', a transparent substrate 4, and a diffraction grating 5. The components having the same functions as those in the display apparatus according to the first embodiment are denoted by the same reference numerals to eliminate description of them.

The LCD 27, 27' is an SPM (Spatial Phase Modulator), which is a hologram display element that produces display beams 2 holographically. The LCD 27, 27' is arranged at a location between the light source 24 and the second interface 4b. More specifically, the LCD 27, 27' is provided on the side of the second interface 4b that is in contact with the air.

In the display apparatus shown in FIG. 6A, a divergent beam 1 emitting from the light source 24 is made incident on the LCD 27. On the other hand, in the display apparatus shown in FIG. 6B, a parallel beam 1' emitting from the light source 24 (not shown) is made incident on the LCD 27'. Moreover, a phase hologram is displayed on the LCD 27, 27', so that a display beam 2 is produced as first-order diffracted light (first-order light). As the display beam 2 propagates in the transparent substrate 4, display beams 2a, 2b, 2c is emitted out of the transparent substrate 4, in the same manner as in the display apparatus according to the first embodiment.

The LCD 27 is displaying a hologram (phase hologram) that produces a parallel display beam 2 when a divergent beam 1 is made incident on it. Therefore, a divergent beam 1 emitted from the light source 24 may be directly made incident on the LCD 27 without any conversion. This consequently allows the light source 24 to be arranged close to the transparent substrate 4 and the LCD 27. Therefore, the display apparatus can be slimmed down or reduced in size.

On the other hand, the LCD 27' shown in FIG. 6B is displaying a hologram that produces a parallel display beam 2 when a parallel beam 1' is made incident on it. Therefore, it is necessary to provide a lens (not shown) in the optical path from the light source 24 to the LCD 27'. However, it is sufficient that only the axial beam be made incident on the LCD 27'. Therefore, the lens can be made simple. For example, the lens may be composed of a small number of lenses. In the case of the display apparatus shown in FIG. 4B, a single lens is adequate as the aforementioned lens. Aberrations of the lens maybe corrected in the aforementioned correction 21 (FIG. 3). For the above reasons, in the case where the beam made incident on the LCD 27' is parallel beam also, the display apparatus can be made slimmer and smaller in size than the conventional display apparatus (shown in FIG. 2A).

In the display apparatuses shown in FIGS. 6A and 6B, the LCD 27, 27' may be arranged at a location a little away from the second interface 4b so long as slimming or size reduction of the display apparatus is not prevented. Alternatively, the LCD 27, 27' may be arranged at a location closer to the first interface 4a than the second interface 4b (namely, at a location between the first interface 4a and the second interface 4b). The light source 24 and the LCD 27, 27' may be arranged on the first interface 4a side.

Hologram information of a hologram displayed on the LCD 27 is corrected by the correction 21 (FIG. 3), as with in the display apparatus according to the first embodiment. With this correction, an accurate display beam 2 is produced when a divergent beam 1 is incident on the LCD 27. Hologram information of a hologram displayed on the LCD 27' is also corrected by the correction 21 (FIG. 3) in a similar manner. With this correction, an accurate display beam 2 is produced when a parallel beam 1' is incident on the LCD 27'.

In the case of the display apparatus shown in FIG. 6A, zero-order light (zero-order diffracted light) transmitted through the LCD 27 is emitted from the transparent substrate 4 as diverging light. Therefore, it does not adversely affect the display (or observation of a virtual image). In the case of the display apparatus shown in FIG. 6B, zero-order light having passed through the LCD 27' is emitted from the transparent substrate 4 perpendicularly without change (i.e. as a parallel beam). Therefore, it does not adversely affect the display (or observation of the virtual image).

In the display apparatus according to this embodiment, the LCD 27 and the LCD 27' are arranged in such a way that the condition that zero order light is transmitted through the transparent substrate 4 and first-order light (or display beams 2) is totally reflected by the transparent substrate 4 (or the interfaces 4a, 4b) is met. Therefore, zero-order light does not adversely affect the display (or observation of the virtual image).

In the case of the display apparatus of this embodiment also, since the beams incident on the viewer's pupil are parallel beams, the viewer sees a virtual image located in rear of the display apparatus, namely a virtual image at infinity. Therefore, even if the viewer's eyes are presbyopic and can be focused only on far points, the viewer can see the picture 8 in focus.

An ordinary LCD that displays intensity information may be used as the LCD 27, 27'. In this case, what is displayed on the LCD is not a phase hologram but an amplitude hologram, leading to lower diffraction efficiency.

In the drawings showing the display apparatus of this embodiment, only the axial display beam 2 is illustrated, and off-axis beams are not illustrated for the sake of simplicity. It should naturally be understood that there also are off-axial beams.

Figure 7A:
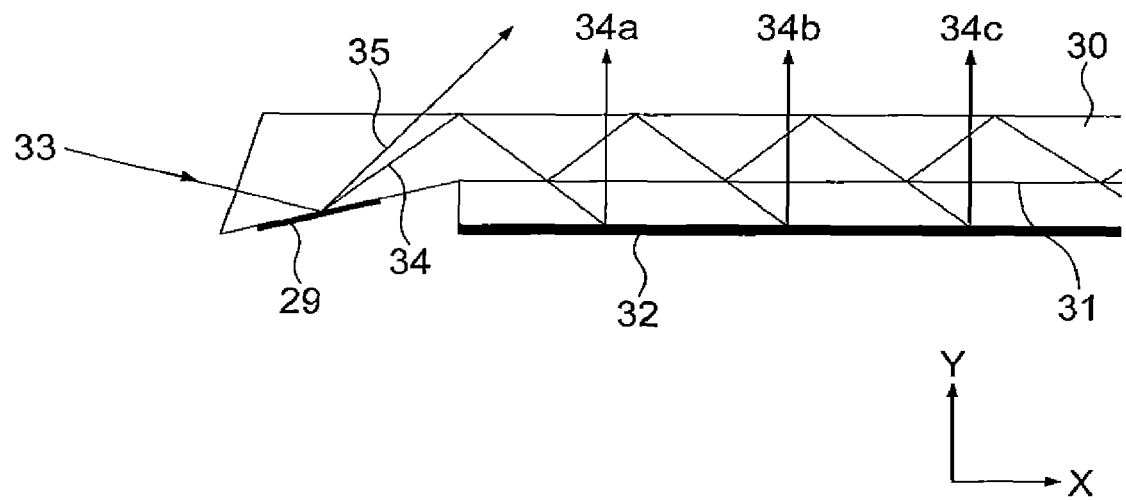
FIGS. 7A and 7B are diagrams showing a display apparatus according to a fourth embodiment, where
Figure 7B:
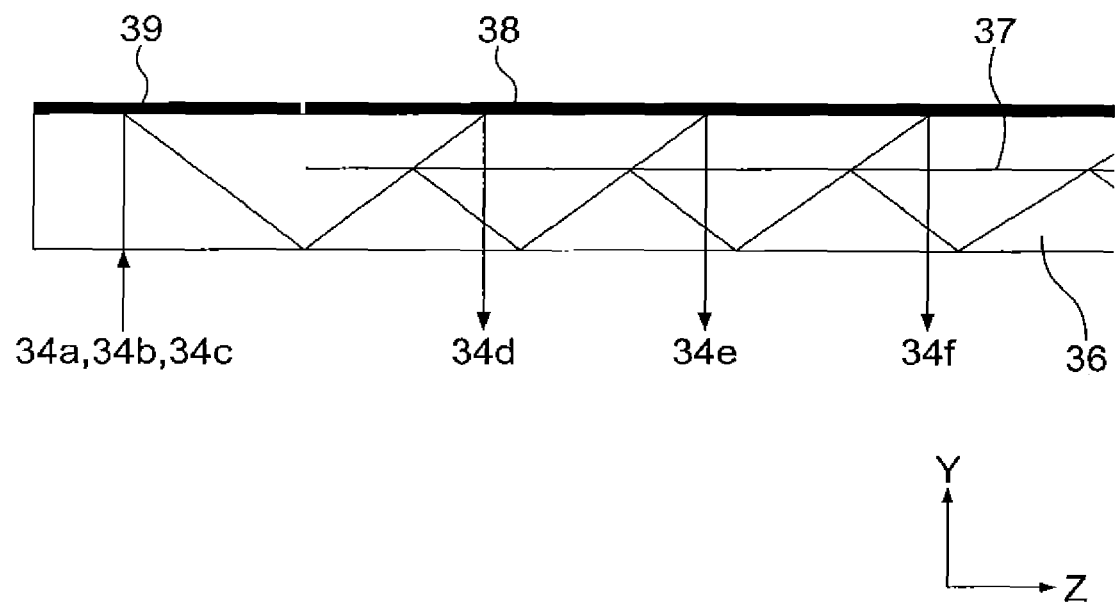
Figure 8:
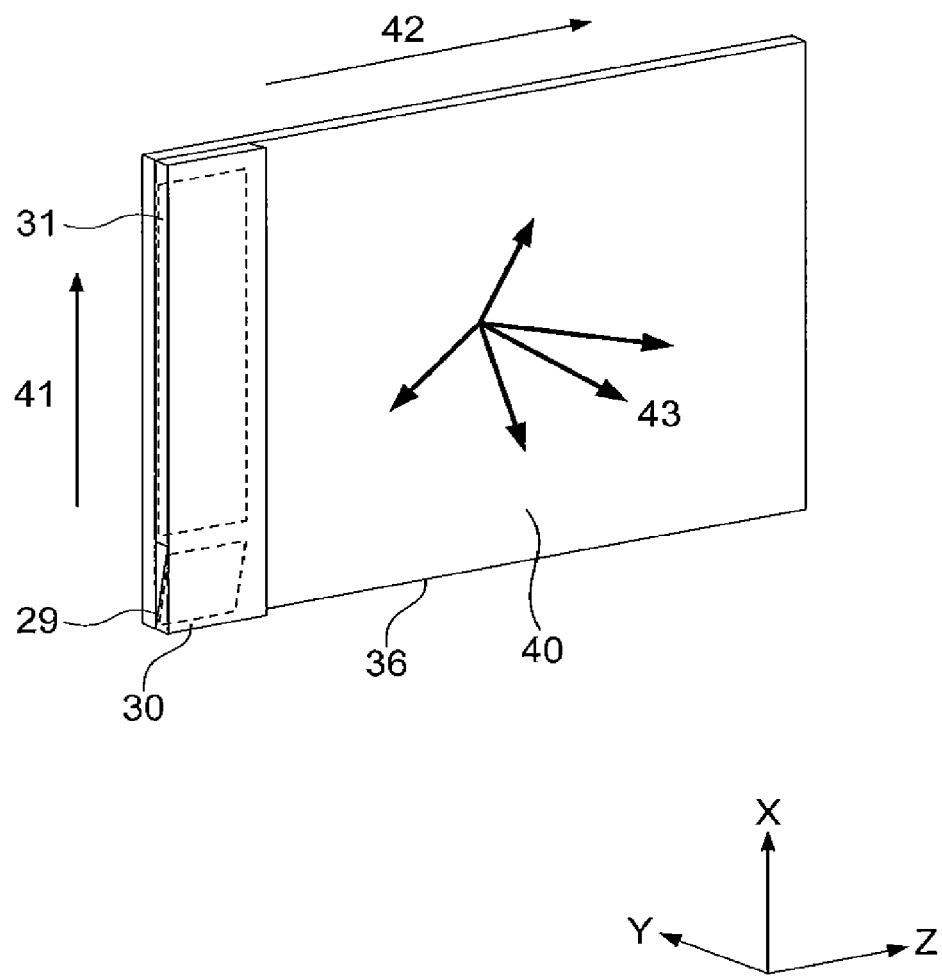
FIG. 8 is a diagram showing the overall construction of the display apparatus according to the fourth embodiment.

A display apparatus according to a fourth embodiment is shown in FIGS. 7A, 7B, and 8. FIG. 7A is a diagram showing the construction of a first transparent substrate and how a display beam propagates. FIG. 7B is a diagram showing the construction of a second transparent substrate and how display beams propagate. FIG. 8 is a diagram showing the overall construction of the display apparatus.

As shown in FIG. 8, the display apparatus of this embodiment has a first transparent substrate 30 and a second transparent substrate 36. The first transparent substrate 30 is located on an end portion of the second transparent substrate 36. The first transparent substrate 30 is fixed to the second transparent substrate 36 at this location.

As shown in FIG. 7A, the first transparent substrate 30 includes an SPM 29, a beam splitter 31, and a diffraction grating 32. As shown in FIG. 7B, the second transparent substrate 36 includes a beam splitter 37, a diffraction grating 38, and a diffraction grating 39. It is preferred that the diffraction gratings 32, 38, and 39 be volume holograms.

The SPM 29 is a spatial phase modulator that produces a display beam 34 holographically. In the first transparent substrate 30 and the second transparent substrate 36, display beams 34 are internally reflected repeatedly to propagate. The beam splitter 31 causes the display beam 34 to partially enter the second transparent substrate 36 every time the display beam 34 is internally reflected in the first transparent substrate 30. The beam splitter 37 causes the display beams 34 to partially emit out of the second transparent substrate 36 every time the display beams 34 are internally reflected in the second transparent substrate 36.

Details will be described in the following. In FIGS. 7A, 7B, and 8, in showing the beam (illumination light) incident on the display apparatus and display beams, only the center ray in the axial beam is illustrated for the sake of simplicity. In the following, they are mentioned as beams. As will naturally be understood, there also are off-axis beams, though not shown in the drawings.

As shown in FIGS. 7A and 8, the first transparent substrate 30 is a transparent member having a rectangular outer shape. The SPM 29, the beam splitter 31, and the diffraction grating 32 are arranged along the direction of its long side (the X axis direction). The display beams 34 propagate along the direction of its long side. The thickness of the first transparent substrate 30 is, for example, 2 to 4 mm.

The outer shapes of the beam splitter 31 and the diffraction grating 32 are both rectangular. The beam splitter 31 and the diffraction grating 32 are arranged in such a way as to be opposed to each other. The beam splitter 31 is arranged between two interfaces of the first transparent substrate 30. The diffraction grating 32 is arranged on one of the interfaces of the first transparent substrate 30.

An end of the aforementioned one interface has a cut portion. The SPM 29 is arranged on an oblique surface of the cut portion. One of the end faces (on a short side) between the two interfaces is a slanted surface. A parallel beam 33 is incident on this slanted surface.

In the display apparatus of this embodiment, a parallel beam 33 emitting from an LD light source (not shown) is made incident on the SPM 29. A display beam 34 is produced as first-order light by a hologram displayed on the SPM 29. The display beam 34 is totally reflected by an internal surface (interface) of the first transparent substrate 30. The display beam 34 having been totally reflected is split by the beam splitter 31 into transmitted light and reflected light.

The transmitted light is incident on the diffraction grating 32 provided on the interface of the first transparent substrate 30. Then, the light is diffracted by the diffraction grating 32 toward the beam splitter 31. The diffracted light is emitted from the first transparent substrate 30 perpendicularly as a display beam 34a. The display beam 34a emitting perpendicularly from the first transparent substrate 30 enters the second transparent substrate 36 (FIG. 7B).

The reflected light is totally reflected by the internal surface (interface) of the first transparent substrate again and incident on the beam splitter 31 again. Then, it is split by the beam splitter 31 again into transmitted light and reflected light.

The transmitted light resulting from the second splitting is incident on the diffraction grating 32. Then, the light is diffracted by the diffraction grating 32 toward the beam splitter 31. The diffracted light is emitted from the first transparent substrate 30 perpendicularly as a display beam 34b. The display beam 34b emitting perpendicularly from the first transparent substrate 30 enters on the second transparent substrate 36 (FIG. 7B).

The reflected light resulting from the second splitting is totally reflected again by the internal surface (interface) of the first transparent substrate 30. Thereafter, a display beam 34c is produced in a similar manner as the display beams 34a and 34b.

As described above, the display beam 34 is totally reflected by the internal surface (interface) of the first transparent substrate 30 repeatedly to propagate in the first transparent substrate 30. As the display beam 34 propagates, the display beam 34a, the display beam 34b, and the display beam 34c successively are emitted from the first transparent substrate 30 perpendicularly and enter the second transparent substrate 36. Here, the number of emitting beams (34a, 34b, 34c) illustrated is three, for the sake of simplicity. The number of the beams is not limited to three.

It is preferable that the diffraction grating 32 be a volume hologram, which provides a high diffraction efficiency. The zero-order light 35 regularly reflected by the SPM 29 is not totally reflected in the first transparent substrate 30 but directly is emitted out of the first transparent substrate 30. The zero-order light 35 thus emitting is vanished by a trap unit (not shown).

As shown in FIGS. 7B and 8, the second transparent substrate 36 is a transparent member having a substantially rectangular outer shape. Its length along the X axis direction (short side) is equal to the length of the long side of the first transparent substrate 30. Its length along the Z axis direction (long side) is longer than the short side of the first transparent substrate 30. The outer shape of the second transparent substrate 36 is not limited to rectangular. The display beams 34 propagate along the Z axis direction. The thickness of the second transparent substrate 36 is, for example, 2 to 4 mm.

As with the diffraction grating 32, the diffraction grating 39 has a rectangular outer shape. It is preferred that the length of the short side of the diffraction grating 39 be not longer than the length of the short side of the first transparent substrate 30. The diffraction grating 39 is arranged on one of the interfaces of the second transparent substrate 36. The diffraction grating 39 is arranged at a location at which it is opposed to the diffraction grating 32.

The beam splitter 37 and the diffraction grating 38 are both arranged in a region that does not overlap the diffraction grating 39 (or the first transparent substrate 30). The beam splitter 37 and the diffraction grating 38 are arranged in such a way as to be opposed to each other. The beam splitter 37 is arranged between the two interfaces of the second transparent substrate 36. The diffraction grating 38 is arranged on one of the interfaces of the second transparent substrate 36 (on the interface on which the diffraction grating 39 is arranged).

The display beams 34a, 34b, 34c incident on the second transparent substrate 36 are diffracted by the diffraction grating 39. The diffracted display beams 34a, 34b, 34c are totally reflected by the internal surface (interface) of the second transparent substrate 36 and incident on the beam splitter 37. In the following, the description will be directed to the display beam 34a.

The display beam 34a is split by the beam splitter 37 into transmitted light and reflected light. The transmitted light is incident on the diffraction grating 38 and diffracted by the diffraction grating 38 toward the beam splitter 37. The diffracted light is emitted from the second transparent substrate 36 perpendicularly as a display beam 34d.

On the other hand, the reflected light is totally reflected again by the internal surface (interface) of the second transparent substrate 36 and incident on the beam splitter 37 again. Then, the light is split by the beam splitter 37 again into transmitted light and reflected light.

The transmitted light resulting from the second splitting is incident on the diffraction grating 38 and diffracted by the diffraction grating 38 toward the beam splitter 37. The diffracted light is emitted from the second transparent substrate 36 perpendicularly as a display beam 34e.

The reflected light resulting from the second splitting is totally reflected again by the internal surface (interface) of the second transparent substrate 36. Then, a display beam 34f is produced in a similar manner as the display beams 34a and 34b.

As described above, the display beam 34a is totally reflected by the internal surfaces (interfaces) of the second transparent substrate 36 repeatedly to propagate in the second transparent substrate 36. As the display beams 34a propagates, the display beam 34d, the display beam 34e, and the display beam 34f successively are emitted from the second transparent substrate 36 perpendicularly. This is also the case with the display beams 34b and 34c. As shown in FIG. 8, the display beams 34 spread along one direction 41 of the display apparatus as they propagate in the first transparent substrate 30 and also spread along another direction 42 of the display apparatus as they propagate in the second transparent substrate 36. Consequently, display beams 43 are emitted from all over the surface 40 of the display apparatus.

As described above, in the display apparatus of this embodiment, the SPM 29 is displaying a hologram that produces a parallel display beam 34 when a parallel beam 33 is incident on it. Therefore, it is necessary to provide a lens (not shown) in the optical path from the light source to the SPM 29. Nevertheless, it is sufficient that only the axial beam be made incident on the SPM 29. Therefore, the lens can be made simple. For example, the lens may be constituted by a small number of lenses. A single lens is adequate as this lens in the display apparatus of this embodiment. Aberrations of the lens may be corrected in the aforementioned correction 21 (FIG. 3). For the above reasons, even though the beam made incident on the SPM 29 is a parallel beam, the display apparatus can be made slimmer and smaller in size than the conventional display apparatus (shown in FIG. 2A).

The beams made incident on the SPM 29 may be a divergent beam. Then, the SPM 29 may be adapted to display a hologram that produces a parallel display beam 34 when a divergent beam is made incident on it. With this arrangement, a divergent beam emitted from the light source may be directly made incident on the SPM 29 without any conversion. This allows the light source to be arranged close to the transparent substrate 30 and the SPM 29. Therefore, the display apparatus can be slimmed down or reduced in size. Alternatively, instead of a divergent beam, a convergent beam may be made incident on the SPM 29.

In the display apparatus of this embodiment, as the display beams propagate, a plurality of display beams 34d, 34e, 34f are emitted from the second transparent substrate 36. A viewer can view an image by seeing one of the display beams or a plurality of display beams. Therefore, the display beams can be regarded collectively as a single display beam having a large diameter. Not only axial display beams representing the center of a picture but also off-axis display beams representing a point on the edge of the picture can also be regarded collectively as a single display beam having a large diameter. Thus, in the display method of this embodiment, multiple beams emitted from the surface 40 of the display apparatus are equivalent to a single display beam having a large diameter emitted from the entirety of the surface 40 of the display apparatus. Therefore, the entirety of the surface 40 of the display apparatus constitutes an exit pupil, and the size of the exit pupil is equal to the size of the surface 40 of the display apparatus. Thus, the size of the pupil is large, as is the case with a magnifier whose pupil extends over its entirety, and therefore the viewer can see a virtual image without locating his/her head near the display apparatus.

The display beams 34d, 34e, 34f (display beams 43) emitted out of the second transparent substrate 36 are beams that display a virtual image at infinity. In other words, when the viewer sees the display beams, a virtual image is formed at infinity (at a distant location). Therefore, each of the plurality of display beams emitted from the second transparent substrate 36 forms, when seen by the viewer, a virtual image at infinity. Consequently, even if the viewer's eyes are presbyopic and can be focused only on far points, the viewer can see display in focus. Moreover, the viewer can see a virtual image formed at infinity by seeing any one of the display beams or seeing a plurality of display beams at the same time. In the first to third embodiments also, two transparent substrates may be used to provide a display apparatus having two-dimensional extension.

In the display apparatus according to this embodiment, the surface on which the SPM 29 is provided is slanted relative to the surface on which the diffraction grating 32 is provided (FIG. 7A). This configuration is effective in cases where it is not possible to provide a sufficiently large angle of diffraction for the display beam 34 emitting from the SPM 29. However, in cases where it is possible to provide a sufficiently large angle of diffraction, it is not necessary to slant the surface on which the SPM 29 is provided relative to the surface on which the diffraction grating 32 is provided. In the latter case, the arrangement the same as the first to third embodiments may be employed.

Figure 9A:
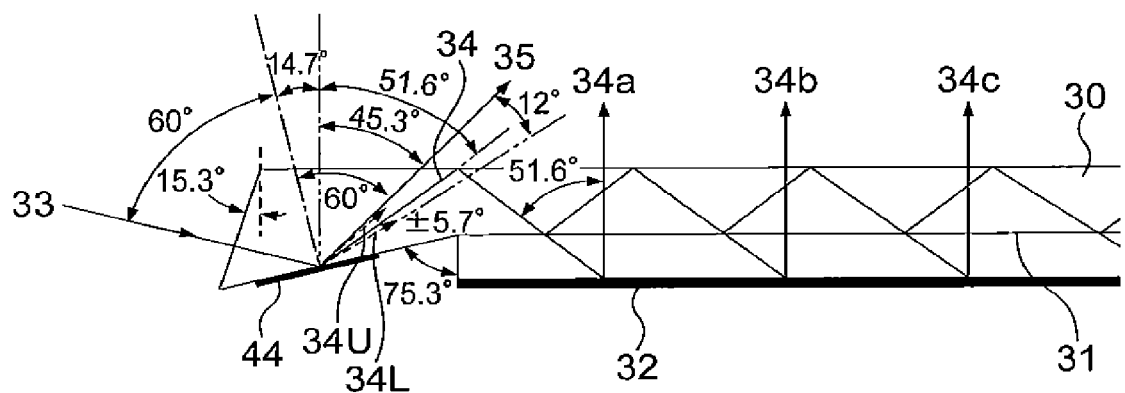
FIGS. 9A and 9B are diagrams showing a construction in the case where a sufficiently large angle of diffraction of a display beam cannot be provided, where
Figure 9B:
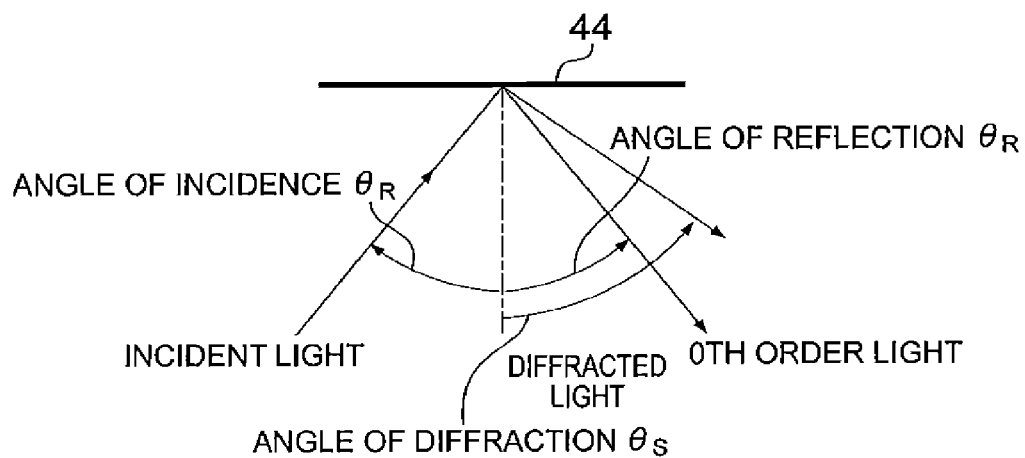

A case in which it is not possible to provide a large angle of diffraction for the display beam emitting from the SPM will be described with reference to FIGS. 9A and 9B. FIG. 9A is a diagram showing the construction of the first transparent substrate, and FIG. 9B is a diagram showing the relationship between the incident light, diffracted light, and zero-order light. The components having the same functions as those shown in FIG. 7A are denoted by the same reference numerals to eliminate description of them.

As described above, a hologram is displayed on the SPM (LCOS, LCD) 44. The hologram is a kind of diffraction grating. Therefore, the light incident on the SPM 44 (at an angle of incidence of $\theta_R$) is diffracted at a angle of diffraction of $\theta_S$ as shown in FIG. 9B. Consequently, diffracted light is emitted from the SPM 44. In addition, zero-order light also is emitted from the SPM 44. The zero-order light is emitted from the SPM 44 at a angle of reflection of $\theta_R$.

The relationship between the angle of incidence $\theta_R$, the angle of diffraction $\theta_S$, and the pitch d of the diffraction grating is as follows, with $\lambda$ being the wavelength of the incident light.

$$d = \frac{\lambda}{\sin\theta_S - \sin\theta_R} \quad \text{(equation 1)}$$

The SPM 44 is structured as a one-dimensional or two-dimensional array of small pixels. A hologram is displayed by the small pixels. Consequently, the size of two small pixels or twice the pixel pitch corresponds to the pitch d of the diffraction grating.

As will be understood from the above equation, if the angle of incidence $\theta_R$ is fixed, the larger the pitch d of the diffraction grating is, or the larger the pixel pitch of the SPM 44 is, the smaller the angle of diffraction $\theta_S$ is. Since the angle of incidence $\theta_R$ is constant, small angles of diffraction $\theta_S$ lead to difficulty in separating the reflected light and the diffracted light.

Hence, when the SPM 44 used has a large pixel pitch, the surface on which the SPM 44 is provided is slanted relative to the surface on which the diffraction grating 32 is provided. This helps separation of the reflected light and the diffracted light.

By way of example, a specific case in which the display apparatus has an angle of view of ±5.7 degrees will be described with reference to FIG. 9A. The angle of view of ±5.7 degrees is intended to be suitable for a case in which the display of a mobile device such as a cellular phone is seen at a distance of distinct vision. Since the view angle range is 11.4 degrees, in order to separate a display beam 34 and zero-order light 35, it is necessary for the display beam 34L (i.e. off-axis principal ray of the display beam (which is diffracted light or first-order diffracted light) and the zero-order light to have an angular difference of at least 12 degrees. When this is the case, the angle formed by the display beam 34L (off-axis principal ray of the display beam 34) and the zero-order light 35 is 0.6 degree, which allows separation of the zero-order light 35.

The pixel pitch of the SPM 44 that displays phase information is 3 μm. Then, the pitch of the diffraction grating (a state of the hologram) displayed on the SPM 44 is 6 μm. If the angle of incidence $\theta_R$ is 60 degrees, the angle of diffraction $\theta_S$ calculated from equation 1 is 72 degrees. Thus, an angular difference of 12 degrees can be provided, as needed.

In this case, in the arrangement shown in FIG. 9A with specific numerical values, the display beam 34 is incident on the internal surface (interface) of the transparent substrate 30 at an angle of incidence of 51.6 degrees, so that the display beam can be totally reflected to propagate in the transparent substrate 30.

Figure 10A:
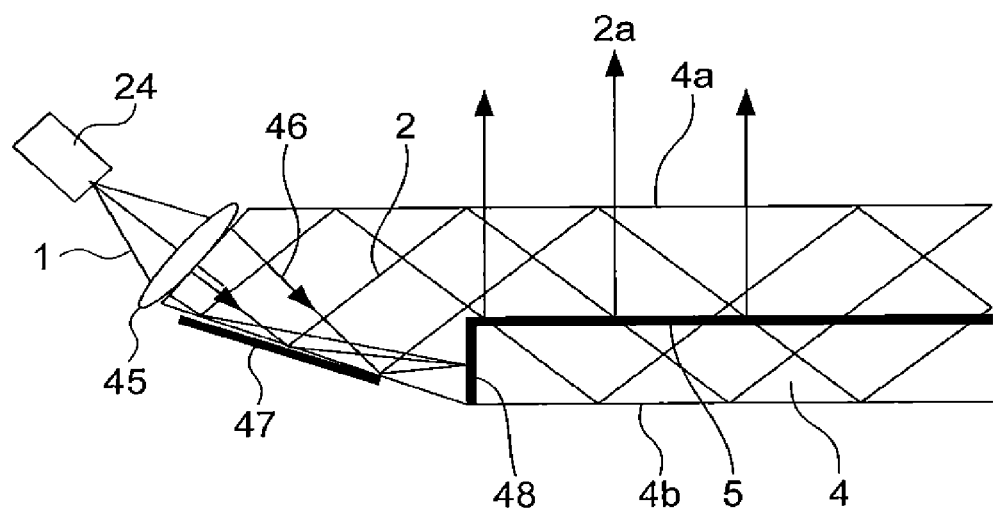
FIGS. 10A and 10B are diagrams showing a display apparatus according to a fifth embodiment, where
Figure 10B:
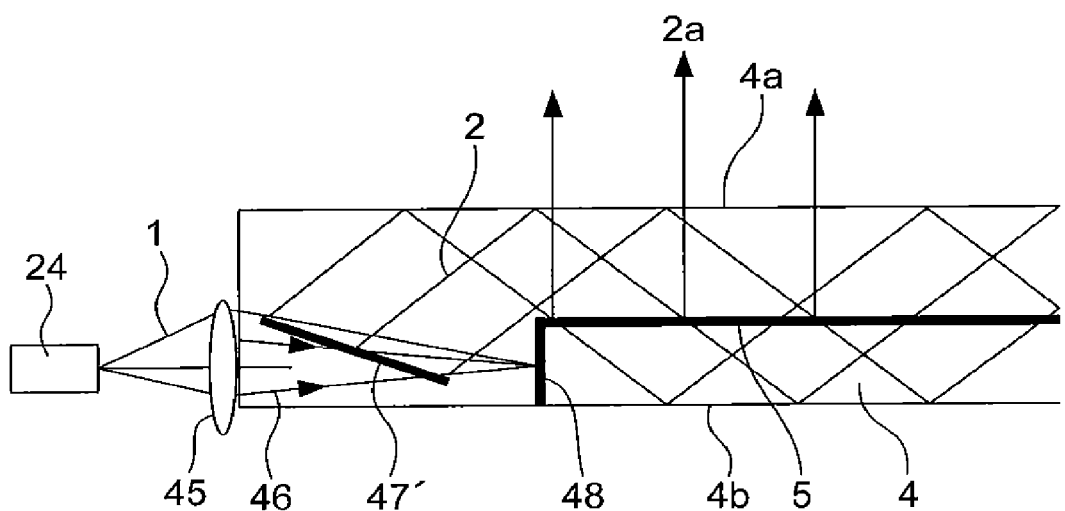

A display apparatus according to a fifth embodiment is shown in FIGS. 10A and 10B. FIG. 10A shows a case in which a reflective spatial phase modulator is used, and FIG. 10B shows a case in which a transmissive spatial phase modulator is used. The display apparatus of this embodiment is adapted to trap zero-order light emitting from the spatial phase modulator. The components having the same functions as those in the display apparatus according to the first embodiment are denoted by the same reference numerals to eliminate description of them. How the display beam 2 propagates and is emitted from the transparent substrate 4 is the same as the display apparatus according to the first embodiment.

In the case of the display apparatus shown in FIG. 10A, a divergent beam 1 emitted from a light source 24 is converted by a lens 45 into a convergent beam 46 and made incident on an LCOS 47. A display beam 2 is produced by a phase hologram displayed on the LCOS 47.

In the display apparatus shown in FIG. 10A, a slanted surface is provided at an end of a first interface 4a. This slanted surface is slanted toward a second interface 4b. The lens 45 is arranged on this slanted surface. A slanted surface is also provided at an end of the second interface 4b. This slanted surface is slanted toward the first interface 4a. The LCOS 47 is arranged on this slanted surface.

A trap 48 is provided at a location from which the slanted surface extends from the second interface 4b. The trap 48 extends perpendicularly from the second interface 4b toward the diffraction grating 5.

On the other hand, in the case of the display apparatus shown in FIG. 10B, a divergent beam 1 emitted from a light source 24 is converted by a lens 45 into a convergent beam 46 and made incident on an LCD 47'. A display beam 2 is produced by a phase hologram displayed on the LCD 47'.

In the display apparatus shown in FIG. 10B, the lens 45 is arranged on the side surface extending between the first interface 4a and the second interface 4b. The LCD 47' is arranged obliquely between the first interface 4a and the second interface 4b. The LCD 47' is located between the lens 45 and the trap 48.

The light source 24 is, for example, a semiconductor laser. The light source 24 emits a divergent beam 1. The divergent beam 1 is converted into a convergent beam 46 by the lens 45. The convergent beam is incident on the LCOS 47/LCD 47'. The LCOS 47/LCD 47' produces zero-order light and a display beam 2.

The LCOS 47 used in the display apparatus shown in FIG. 10A is a reflective SPM. Therefore, zero-order light regularly reflected by the LCOS 47 travels toward the trap 48. On the other hand, the LCD 47' used in the display apparatus shown in FIG. 10B is a transmissive SPM. Therefore, zero-order light that has straightly passed (or been transmitted) through the LCD 47 travels toward the trap 48.

The trap 48 is a component that absorbs or blocks light. Therefore, the zero-order light incident on the trap 48 is absorbed or blocked the trap 48. Consequently, the zero-order light does not adversely affect the display beam 2 (or observation of the virtual image).

In the display apparatus of this embodiment, the beam made incident on the LCOS 47/LCD 47' is a convergent beam 46. Consequently, the zero-order light emitting from the LCOS 47/LCD 47' is also a convergent beam. Therefore, the zero-order beam does not diverge while it travels to the trap 48. In consequence, the zero-order light does not adversely affect the display beam 2. It is preferred that the beam diameter of the zero-order light at the location of the trap 48 be smaller than the size of the trap 48. It is more preferred that the zero-order beam converges to a spot, if possible.

The hologram information of the hologram displayed on the LCOS 47/the LCD 47' is corrected by the correction 21 (FIG. 3). With this correction, an accurate display beam 2 is produced when the convergent beam 46 is incident on the LCOS 47/LCD 47'.

The lens 45 may be integral with the transparent substrate 4. Alternatively, the lens 45 may be replaced by a LCOS or an ordinary hologram, as is the case with the second embodiment. This enables slimming and size reduction of the display apparatus.

In the display apparatus shown in FIG. 10B, the LCD 47' is integrally provided in the transparent substrate 4. In practice, however, the LCD 47' is sandwiched between two transparent members, in an exemplary case. For example, in the structure shown in FIG. 10A, the LCD 47 may be replaced by the LCD 47', and the LCD 47' may be covered with another transparent member from the side of the LCD 47'.

Figure 11:
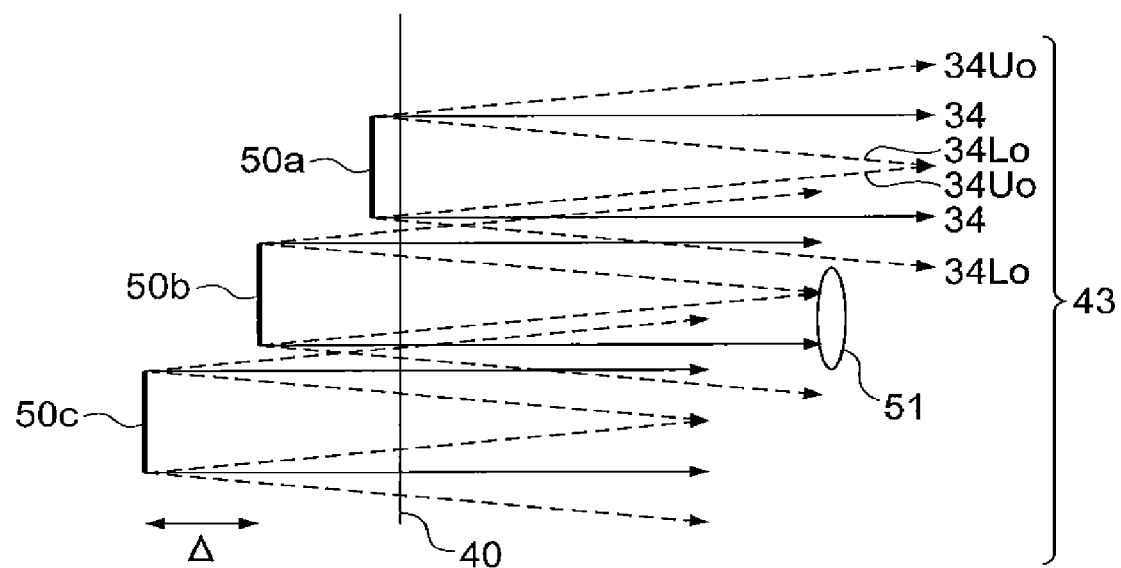
FIG. 11 is a diagram showing beams emitted from the display apparatus of the embodiment, where the optical distances of the beams are visualized.

FIG. 11 is a diagram showing beams emitted from the display apparatus of this embodiment, where the optical distances of the beams are visualized. This will be described in the following taking the display apparatus according to the fourth embodiment as an example.

As shown in FIG. 8, display beams 43 is emitted from the surface 40 of the second transparent substrate 36 in the display apparatus. The display beams 43 include display beams 34d, 34e, 34f shown in FIG. 7B. (It should be understood that a lot of beams other than these three beams are emitted from the surface 40.) When the viewer sees the display apparatus as such, a part of the display beams is incident on the viewer's eye 51, and the viewer can see the display (i.e. an virtual image).

FIG. 11 shows display beams emitting from three positions 50a, 50b, 50c. The three display beams include a display beam 34, an outermost off-axis display beam 34Uo, and an outermost off-axis display beam 34Lo. The display beam 34 corresponds to a beam emitting from an axial point (at the center of a picture). The outermost off-axis display beam 34Uo corresponds to a beam emitting from an outermost off-axis point (on one edge of the picture). The outermost off-axis display beam 34Lo corresponds to a beam emitting from an outermost off-axis point (of the other edge of the picture).

The positions 50a, 50b, and 50c represent optical positions of the SPM 29 (FIG. 8) seen from the viewer. These optical positions represent the distances from the surface 40 of the second transparent substrate 36 to the SPM 29.

The position 50a represents the optical position of the SPM 29 in the case where the display beam 34 is totally reflected in the second transparent substrate 36 only once and is emitted out of it. The position 50b represents the optical position of the SPM 29 in the case where the display beam is totally reflected in the second transparent substrate 36 twice and is emitted out of it. The position 50c represents the optical position of the SPM 29 in the case where the display beam is totally reflected in the second transparent substrate 36 three times and is emitted out of it.

Here, the difference of two optical positions is represented by the difference A of the optical distances. The difference A of the optical distances is the propagation distance resulting from one total reflection in the second transparent substrate 36. More specifically, it is the distance through which the display beam 34 propagates (or travels) from the beam splitter 37 to the interface and them back from the interface to the beam splitter 37.

While three optical positions are illustrated in FIG. 11, there are optical positions of the SPM 29 as many as the beams propagating while totally reflected repeatedly in a two dimensional manner. Typically, display beams emitting from a plurality of different optical positions of the SPM 29 are incident on the viewer's pupil.

The SPM 29 produces display beam 34, the outermost off-axis display beam 34Lo, and the outermost off-axis display beam 34Uo holographically with coherent light. Consequently, the display beam 34, the outermost off-axis display beam 34Lo, and the outermost off-axis display beam 34Uo are also coherent beams. While in the case shown in FIG. 11, the display beams incident on the viewer's pupil 51 are mainly display beams (34, 34L, 34U) emitting from the position 50b, display beams emitting from the positions 50a and/or 50c may also be incident on the pupil 51 if the pupil 51 is located at a different position.

As described above, the display beams emitting from the positions 50a, 50b, and 50c are coherent beams. Consequently, if a display beam emitting from the position 50b and a display beam emitting from the position 50a are incident on the viewer's pupil 51, the two beams would interfere, so that the viewer see an unintended image (virtual image). The unintended image is, for example, an image having deteriorated image quality.

In view of the above, it is preferred that the coherence length of the light source 24 be shorter than the difference A of optical distances. In other words, it is preferred that the coherence length of the light source 24 be shorter than the propagation distance resulting from one total reflection in the second transparent substrate 36. If this is the case, it is possible to prevent an unintended image from being formed, even if a plurality of display beams having different optical distances are incident on the viewer's eye.

In the display apparatuses according to the above-described embodiments, an SPM is used to produce display beams holographically. However, display beams can be produced holographically without using an SPM. For example, in the case of still images, it is not necessary to change a hologram pattern. Therefore, a film on which a hologram pattern is recorded may be set at the position of the SPM. The film may be replaced by something having properties that allow recording of a hologram pattern only once.

The present invention can provide a display method and display apparatus having excellent optical performance while being small and slim.

The display method and apparatus according to the present invention is advantageous in that the apparatus can have excellent optical performance while being small and slim.

What is claimed is:

1. A display apparatus comprising:
   a spatial phase modulator that produces a display beam holographically; and
   a first transparent substrate and a second transparent substrate in which the display beam is internally reflected repeatedly to propagate in them, wherein:
   the first transparent substrate includes a first beam splitter and a first diffraction grating;
   the first beam splitter is arranged between two interfaces of the first transparent substrate;
   the first diffraction grating is arranged in such a way as to be opposed to the first beam splitter, the first diffraction grating is arranged on one side of the interfaces of the first transparent substrate;
   the first diffraction grating diffracts a light in on the first diffraction grating after the light transmits the first beam splitter, the first diffraction grating emits the light from the other side of the first transparent substrate;
   the second transparent substrate includes a second beam splitter, a second diffraction grating and a third diffraction grating;
   the second beam splitter is arranged between two interfaces of the second transparent substrate;

the second diffraction grating is arranged in such a way as to be opposed to the first diffraction grating, the second diffraction grating is arranged on one side of the interfaces of the second transparent substrate;

the third diffraction grating is arranged in such a way as to be opposed to the first diffraction grating, the third diffraction grating is arranged on one side of the interfaces of the second transparent substrate, the third diffraction grating is arranged in a region that does not overlap the second diffraction grating;

the second diffraction grating diffracts the light emitted from the first diffraction grating, the second diffraction grating causes to incident the light on the other interface of the second transparent substrate within the total reflection angle;

the third diffraction grating diffracts the light incident on the third diffraction grating after the light transmits the second beam splitter; and the third diffraction grating emits the light from the other side of interface of the second transparent substrate.

2. The display apparatus according to claim 1, wherein an end of one interface of the first transparent substrate has a cut portion, the spatial phase modulator is arranged on an oblique of the cut portion, and at feast one of the end surfaces between two interfaces of the first transparent substrate k a slanted surface.

3. The display apparatus according to claim 1, wherein a longitudinal direction of the first transparent substrate and a longitudinal direction of the second transparent substrate are intersected.

4. The display apparatus according to claim 1, wherein a thickness of the first transparent substrate is 2 to 4 mm, and a thickness of the second transparent is 2 to 4 mm.

5. The display apparatus according to claim 1, wherein the first diffraction grating, the second diffraction grating and the third diffraction grating are volume holograms.

6. The display apparatus according to claim 5, wherein an end of one interface of the first transparent substrate has a cut portion, the spatial phase modulator is arranged on an oblique of the cut portion, and at least one of the end surfaces between two interfaces of the first transparent substrate is a slanted surface.

7. The display apparatus according to claim 5, wherein a longitudinal direction of the first transparent substrate and a longitudinal direction of the second transparent substrate are intersected.

8. The display apparatus according to claim 5, wherein a thickness of the first transparent substrate is 2 to 4 mm, and a thickness of the second transparent is 2 to 4 mm.

* * * * *